3,506,692
PROCESS FOR PREPARING $\Delta^{5(10)}$-3-OXO-19-NORSTEROID COMPOUNDS
Katsumi Tanabe and Ryozo Hayashi, Tokyo, Japan, assignors to Sankyo Company Limited, Tokyo, Japan
No Drawing. Filed July 10, 1968, Ser. No. 743,587
Claims priority, application Japan, July 25, 1967, 42/47,763
Int. Cl. C07c *169/00*
U.S. Cl. 260—397.3          4 Claims

ABSTRACT OF THE DISCLOSURE

The application is directed to process for the preparation of $\Delta^{5(10)}$-3-oxo-19-norsteroid compounds which have been known useful as sex homones or as intermediates thereof. The process comprises subjecting $\Delta^5$-3β-hydroxy-10β-carboxy-19-norsteroid compounds to Oppenauer oxidation.

---

This invention relates to a novel process for the preparation of $\Delta^{5(10)}$ - 3 - oxo-19-norsteroid compounds. More particularly, it relates to a novel process for preparing $\Delta^{5(10)}$-3-oxo-19-norsteroid compounds having the partial structure, with which only rings A and B are concerned, of the formula

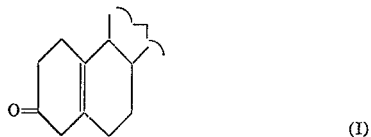

which comprises subjecting $\Delta^5$-3β-hydroxy-10β-carboxy-19-norsteroid compounds having the partial structure, with which only rings A and B are concerned, of the formula

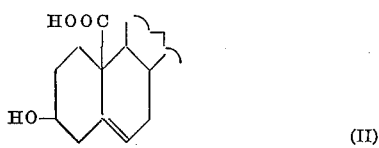

to Oppenauer oxidation.

Some of these compounds (I), for example 17α-ethynyl-17β-hydroxy-19-norandrost-5(10)-en-3-one, have been known to possess a progestational activity and thus used as oral contraceptives, while others have been used as significant intermediates in the preparation of sex hormones etc.

However, the process for preparing the compounds (I) from the compounds (II) is disclosed in the Gazzetta Chimica Italiana, vol. 91, p. 1420 (1961). According to the disclosure of said literature, the compounds (I) are prepared as follows: 3β,17β-dihydroxy-10β-carboxy-19-norandrost-5-ene is oxidized to 3,17-dioxo-10β-carboxy-19-norandrost-5-ene by Jones' reagent and then the latter is converted into 3,17-dioxo-19-norandrost-5(10)-ene by heating in pyridine. As a result of investigations for finding out a simple and economical process for preparing the compounds (I) from the compounds (II), we have unexepectedly found that, when the compounds (II) are subjected to Oppenauer oxidation, the decarboxylation of the 10β-carboxy group and the rearrangement of the double bond at 5,6-position to 5,10-position occur simultaneously with the oxidation of the hydroxy group at 3-position.

It is the object of this invention to provide a novel process for preparing the compounds (I) which is simple and economical.

According to this invention, the desired compounds (I) are produced by subjecting the compounds (II) to Oppenauer oxidation. The Oppenauer oxidation in this invention is carried out under ordinary Oppenauer oxidation conditions. Namely, the compounds (II) are reacted with an aluminum alkoxide and a hydrogen acceptor in an organic solvent.

The aluminum alkoxide used in this invention includes, for example, aluminum isopropoxide or aluminum t-butoxide, the hydrogen acceptor is for example, acetone methylethylketone, cyclohexanone or benzophenone and the solvent is such organic solvent as benzene, toluene and xylene.

The reaction temperature is not a critical feature of this invention, but, in general, it is preferred to carry out the reaction at a temperature ranging from about 80° C. to 140° C. The reaction time depends mainly upon the reaction temperature employed, but usually, it is preferred to carry out the reaction for from about 15 minutes to 3 hours. For example, in the case where toluene as the solvent, cyclohexanone as the hydrogen acceptor and aluminum isopropoxide as the aluminum alkoxide are used respectively, the reaction mixture is heated at refluxed temperature of the system for from 50 minutes to one and a half hours. After completion of the reaction, the reaction product may be recovered from the reaction mixture by a known procedure. For example, after completion of the reaction, the reaction mixture is cooled and then to the reaction mixture is added water, aqueous acetic acid solution or aqueous Rochelle salt solution in order to decompose excess of the aluminum alkoxide. The resulting mixture is subjected to steam distillation. The residue is extracted with a suitable solvent such as ethyl acetate, benzene and ether. The solvent in the extract is evaporated and the residue is recrystallized from a suitable organic solvent such as benzene, ether, n-hexane and ethylacetate or chromatographed on alumina column.

Examples of the favorable starting compounds (II) are as follows:

3β-hydroxy-10β-carboxy-19-norandrost-5-en-17-one,
3β,17β-dihydroxy-10β-carboxy-19-norandrost-5-ene 17β-acetate,
3β,17β-dihydroxy-17α-methyl-10β-carboxy-19-norandrost-5-ene,
3β,17β-dihydroxy-17α-ethynyl-10β-carboxy-19-norandrost-5-ene,
3β-hydroxy-10β-carboxy-19-norpregn-5-en-20-one,
3β-hydroxy-10β-carboxy-19-norcholest-5-ene.

Examples of the desired compounds (I) are as follows:
19-norandrost-5(10)-en-3,17-dione,
17β-hydroxy-19-norandrost-5(10)-en-3-one 17β-acetate,
17α-methyl-17β-hydroxy-19-norandrost-5(10)-en-3-one,
17α-ethynyl-17β-hydroxy-19-norandrost-5(10)-en-3-one,
19-norpregn-5(10)-en-3,20-dione,
19-norcholest-5(10)-en-3-one.

The following examples are given by way of illustration only and as not limiting the scope of this invention.

EXAMPLE 1

17α-ethynyl-17β-hydroxy-19-norandrost-5(10)-en-3-one (1) To a solution of 30 ml. of dry toluene and 10 ml. of cyclohexanone is added 1.038 g. of 3β,17β-dihydroxy-17α-ethynyl-10β-carboxy-19-norandrost-5-ene. From the solution is distilled out 5 ml. of toluene in order to remove a trace of water. To the mixture is added dropwise over about 20 minutes under refluxing and stirring a solution of 0.41 g. of aluminum isopropoxide and 20 ml. of dry toluene, while about 20 ml. of toluene is distilled out. Stirring is continued for further one hour under reflux and then the reaction mixture is cooled. Excess of the aluminum isopropoxide in the mixture is decomposed by addition of a solution of 2 g. of Rochelle salt in 5 ml. of water. The mixture is subjected to steam distillation. The residue is extracted with ethyl acetate and the extract is washed with water and dried over anhydrous sodium sulfate. The ethyl acetate is evaporated to obtain 0.77 g. of a crude crystalline substance. The crystalline substance is recrystallized from a mixture of benzene and n-hexane to give 0.56 g. of the pure desired product as prisms with M.P. 164° C. The mother liquor from recrystallization is chromatographed on alumina column. Elution with benzene-n-hexane (1:1) additionally gives 0.09 g. of the pure desired product. Total yield is 74%. The product thus obtained is identified with an authentic specimen by means of a mixed melting point and infrared spectra.

(2) To a solution of 150 ml. of dry benzene and 50 ml. of cyclohexanone is added 5.00 g. of 3β,17β-dihydroxy-17α-ethynyl-10β-carboxy-19-norandrost-5-ene. To the solution is added dropwise under refluxing and stirring a solution of 2 g. of aluminum isopropoxide in 20 ml. of dry benzene. Stirring is continued for further three hours under reflux while about 20 ml. of benzene is slowly distilled out and then the reaction mixture is cooled. Excess of the aluminum isopropoxide in the mixture is decomposed by the addition of 5 ml. of a saturated aqueous Rochelle salt solution. The mixture is subjected to steam distillation.

The residue is made alkaline by addition of 50 ml. of a 2% aqueous sodium hydroxide solution. The resulting mixture is extracted with benzene and the extract is washed with water and dried over anhydrous sodium sulfate. The benzene is evaporated to obtain 4.0 g. of a crude crystalline substance. The crude crystalline substance is recrystallized from a mixture of ethyl acetate and n-hexane to give 3.10 g. of the pure desired product. The mother liquor from recrystallization is chromatographed on alumina column. Elution with benzene-n-hexane (1:1) additionally gives 0.54 g. of the pure desired product.

The product thus obtained is identified with an authentic specimen by means of a mixed melting point and infrared spectra.

EXAMPLE 2

19-norandrost-5(10)-en-3,17-dione

To a solution of 30 ml. of dry toluene and 10 ml. of cyclohexanone is added 1.0 g. of 3β-hydroxy-10β-carboxy-19-norandrost-5-en-17-one. From the mixture is distilled out 5 ml. of the toluene. To the solution is added dropwise over about 20 minutes under refluxing and stirring a solution of 0.45 g. of aluminum isopropoxide in 20 ml. of dry toluene, while about 20 ml. of toluene is distilled out. Stirring is continued for further 50 minutes under reflux and then the reaction mixture is cooled. Excess of the aluminum isopropoxide in the mixture is decomposed by addition of water. The mixture is subjected to steam distillation. The residue is extracted with ether and the extract is washed with water and dried over anhydrous sodium sulfate. The ether is evaporated from the extract to obtain 0.91 g. of a crude crystalline substance. The crude crystalline substance is recrystallized from a mixture of ether and n-hexane to give the pure desired product with M.P. 146° C.

The product thus obtained is identified with an authentic specimen by means of a mixed melting point and infrared spectra.

EXAMPLE 3

17α-methyl-17β-hydroxy-19-norandrost-5(10)-en-3-one

To a solution of 40 ml. of dry toluene and 12 ml. of cyclohexanone is added 1.2 g. of 17α-methyl-3β,17β-dihydroxy - 10β-carboxy-19-norandrost-5-ene. From the mixture is distilled out 5 ml. of the toluene. To the mixture is added dropwise over about 20 minutes under refluxing and stirring a solution of 0.50 g. of aluminum isopropoxide in 25 ml. of dry toluene, while about 20 ml. of toluene is distilled out. Stirring is continued for further one hour under reflux and then the reaction mixture is cooled. Excess of the aluminum isopropoxide in the mixture is decomposed by the addition of 0.7 g. of acetic acid.

The mixture is subjected to steam distillation. The residue is treated in the same manner as shown in Example 2 to give 1.06 g. of a crude crystalline substance. The crude crystalline substance is recrystallized from isopropyl ether to give 0.70 g. of the pure desired product as needles with M.P. 141–142° C.

The product thus obtained is identified with an authentic specimen by means of a mixed melting point and infrared spectra.

We claim:

1. A process for preparing an androstene or pregnene compound having the partial structure, with which only rings A and B are concerned, of the formula,

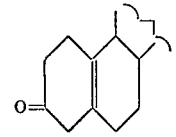

which comprises subjecting an androstene or pregnene having the partial structure, with which only rings A and B are concerned, of the formula

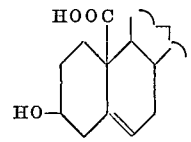

to Oppenauer oxidation.

2. A process for preparing 17α-ethynyl-17β-hydroxy-19 - norandrost-5(10)-en-3-one which comprises reacting 17α - ethynyl - 3β,17β - dihydroxy - 10β - carboxy - 19-norandrost-5-ene with aluminum isopropoxide and cyclohexanone.

3. A process for preparing 19-norandrost-5(10)-en-3,17-dione which comprises reacting 3β-hydroxy-10β-carboxy - 19-norandrost-5-en-17-one with aluminum isopropoxide and cyclohexanone.

4. A process for preparing 17α-methyl-17β-hydroxy-19-norandrost-5(10)-en-3-one which comprises reacting 17α - methyl - 3β,17β - dihydroxy - 10β - carboxy - 19-norandrost-5-ene with aluminum isopropoxide and cyclohexanone.

References Cited

UNITED STATES PATENTS 3,272,847  9/1966  Irvine et al. _____ 260—397.3
3,346,601  10/1967  Wettstein et al. ____ 260—397.4

OTHER REFERENCES

Gardi et al.: Gazz. Chim. Ital., 93, May 1963, pp. 514–524, pp. 517, 522 and 523 pertinent.

ELBERT L. ROBERTS, Primary Examiner

E. G. LOVE, Assistant Examiner

U.S. Cl. X.R.

260—397.2, 397.4, 999